June 9, 1931.   L. S. WILBUR   1,809,092
SPLICE BAR OR FISH PLATE
Filed April 15, 1929   8 Sheets-Sheet 1
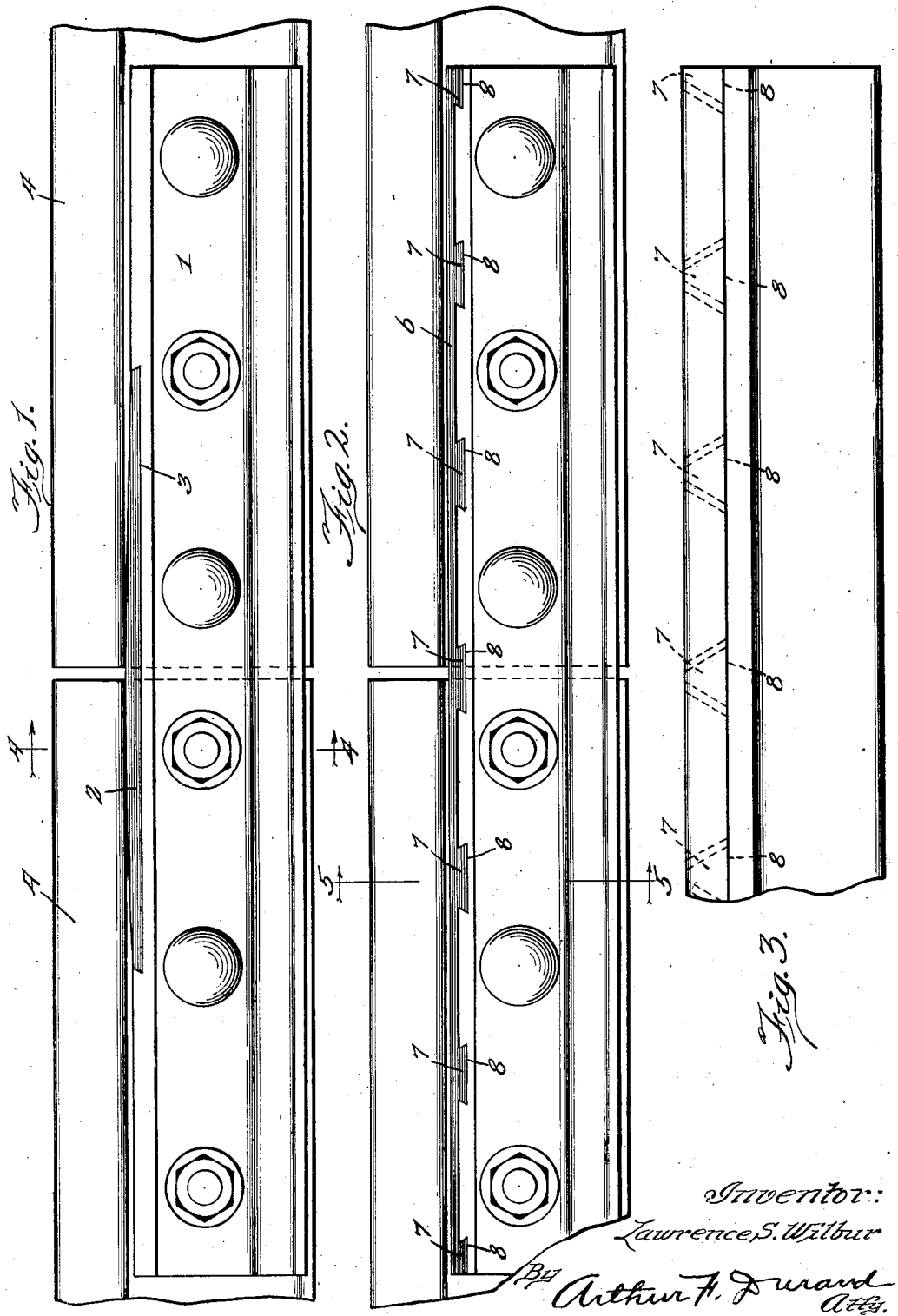
Inventor:
Lawrence S. Wilbur
By Arthur H. Durand
Atty.

June 9, 1931.  L. S. WILBUR  1,809,092
SPLICE BAR OR FISH PLATE
Filed April 15, 1929  8 Sheets-Sheet 2
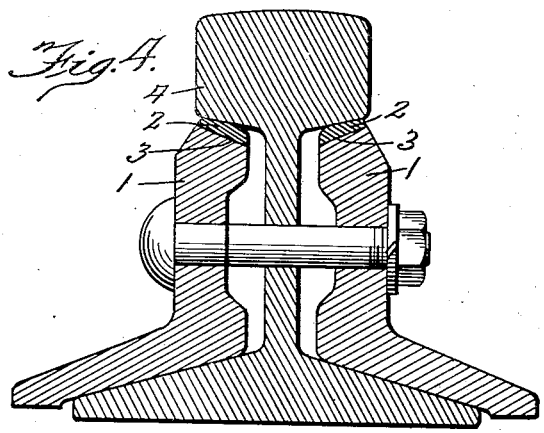
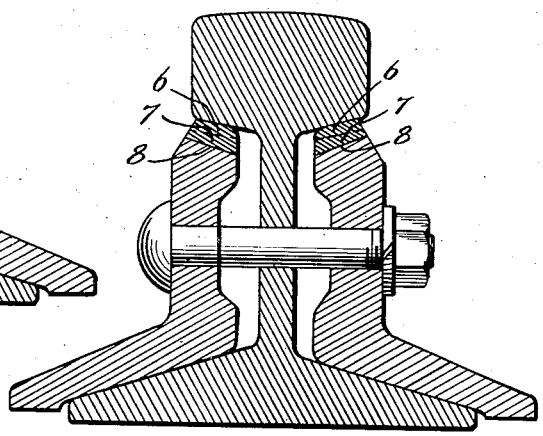
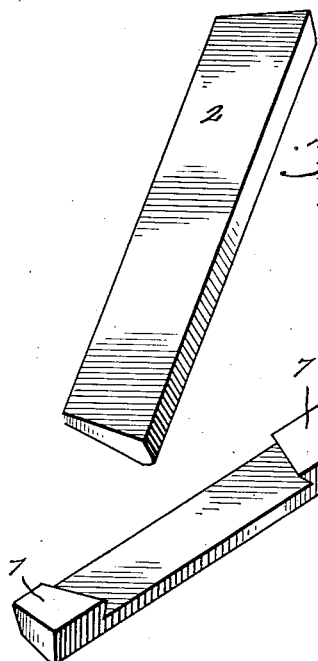
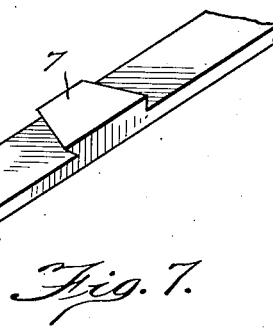
Inventor:
Lawrence S. Wilbur
By
Arthur F. Durand
Atty.

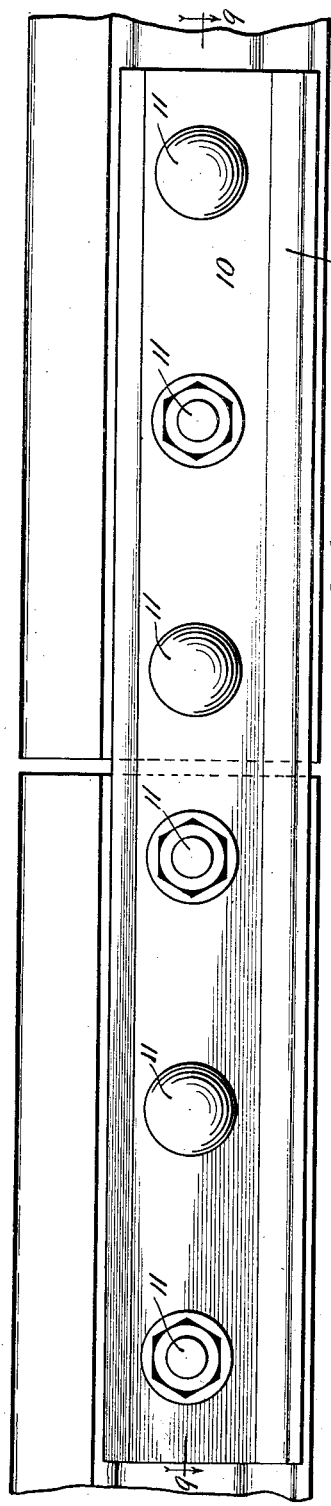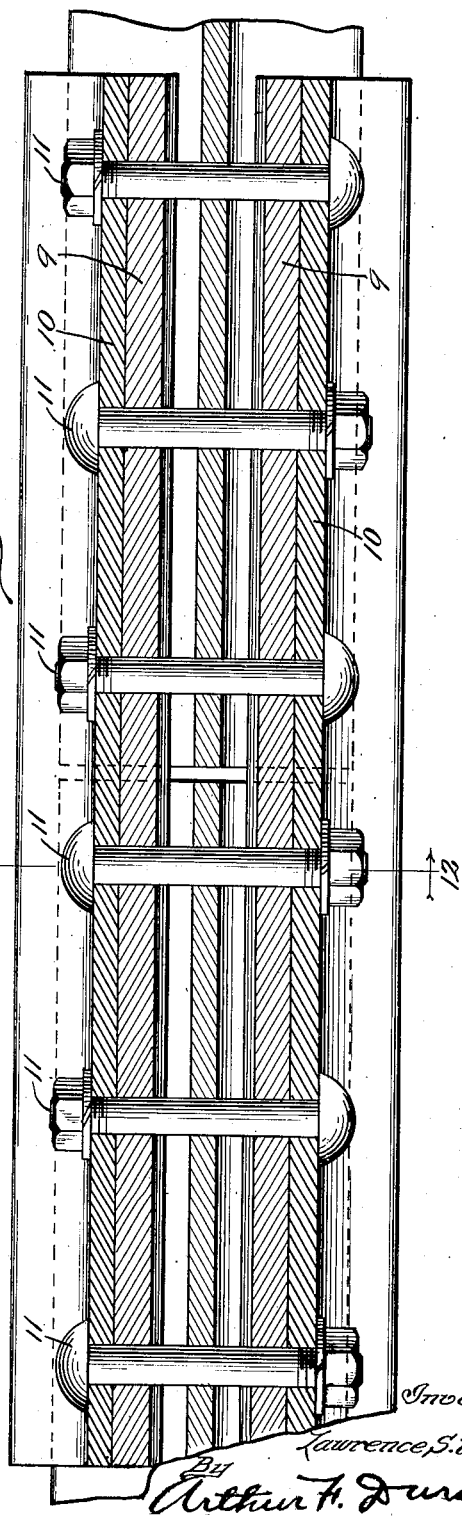

June 9, 1931.  L. S. WILBUR  1,809,092
SPLICE BAR OR FISH PLATE
Filed April 15, 1929  8 Sheets-Sheet 4
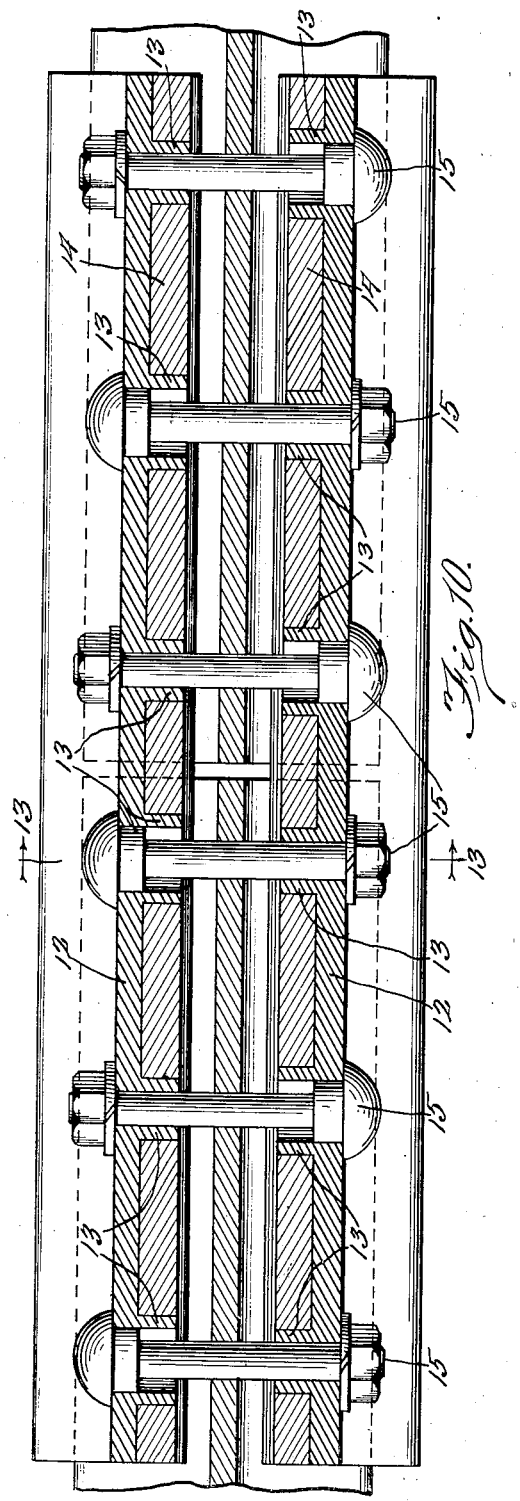
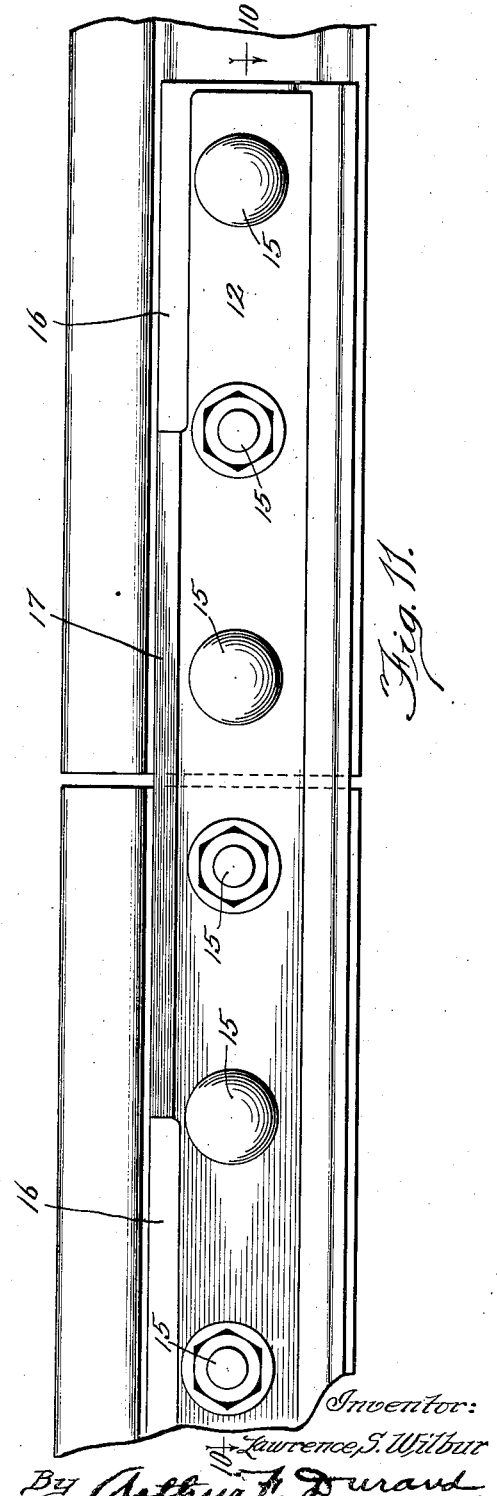
Inventor:
Lawrence S. Wilbur
By Arthur F. Durand
Atty.

June 9, 1931.  L. S. WILBUR  1,809,092
SPLICE BAR OR FISH PLATE
Filed April 15, 1929  8 Sheets-Sheet 6
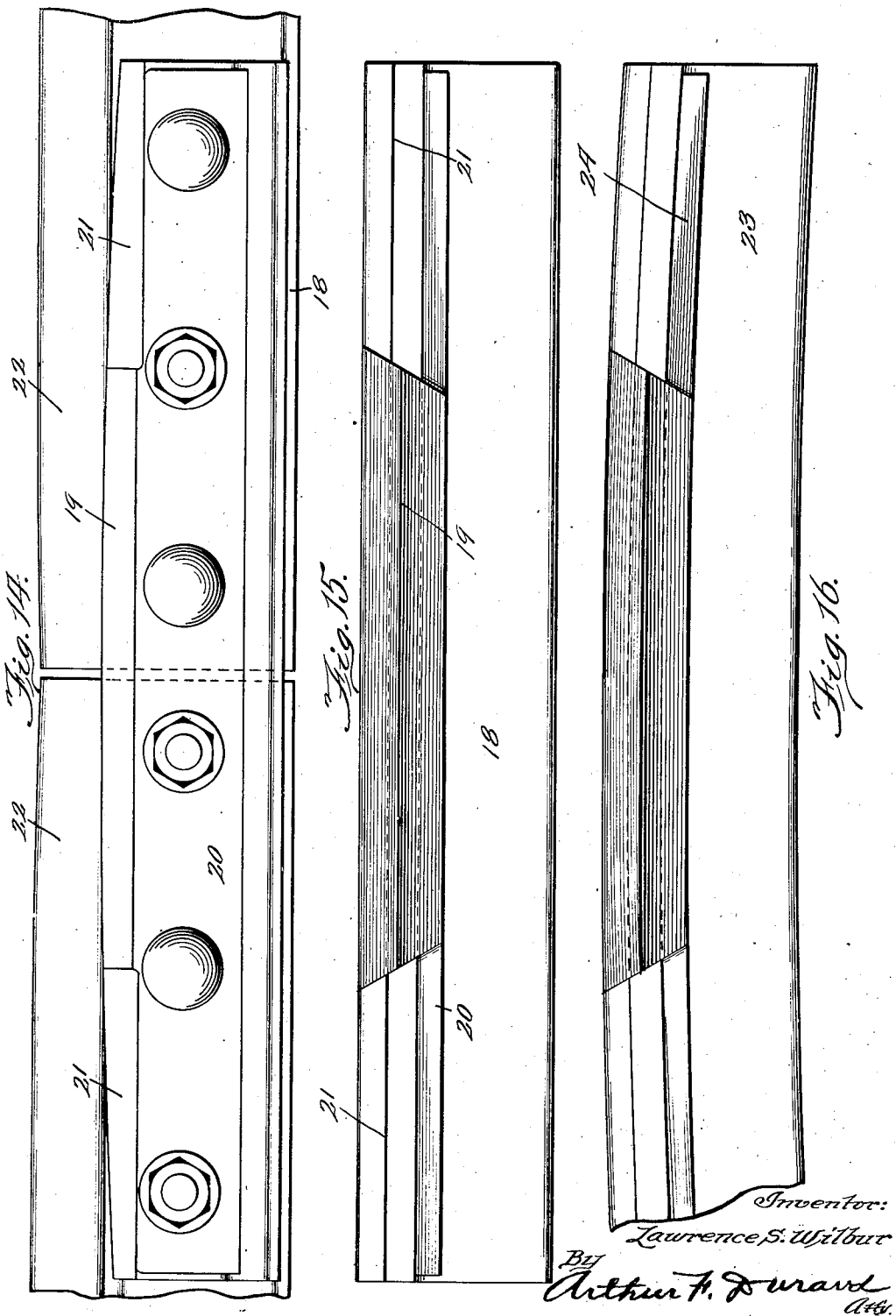

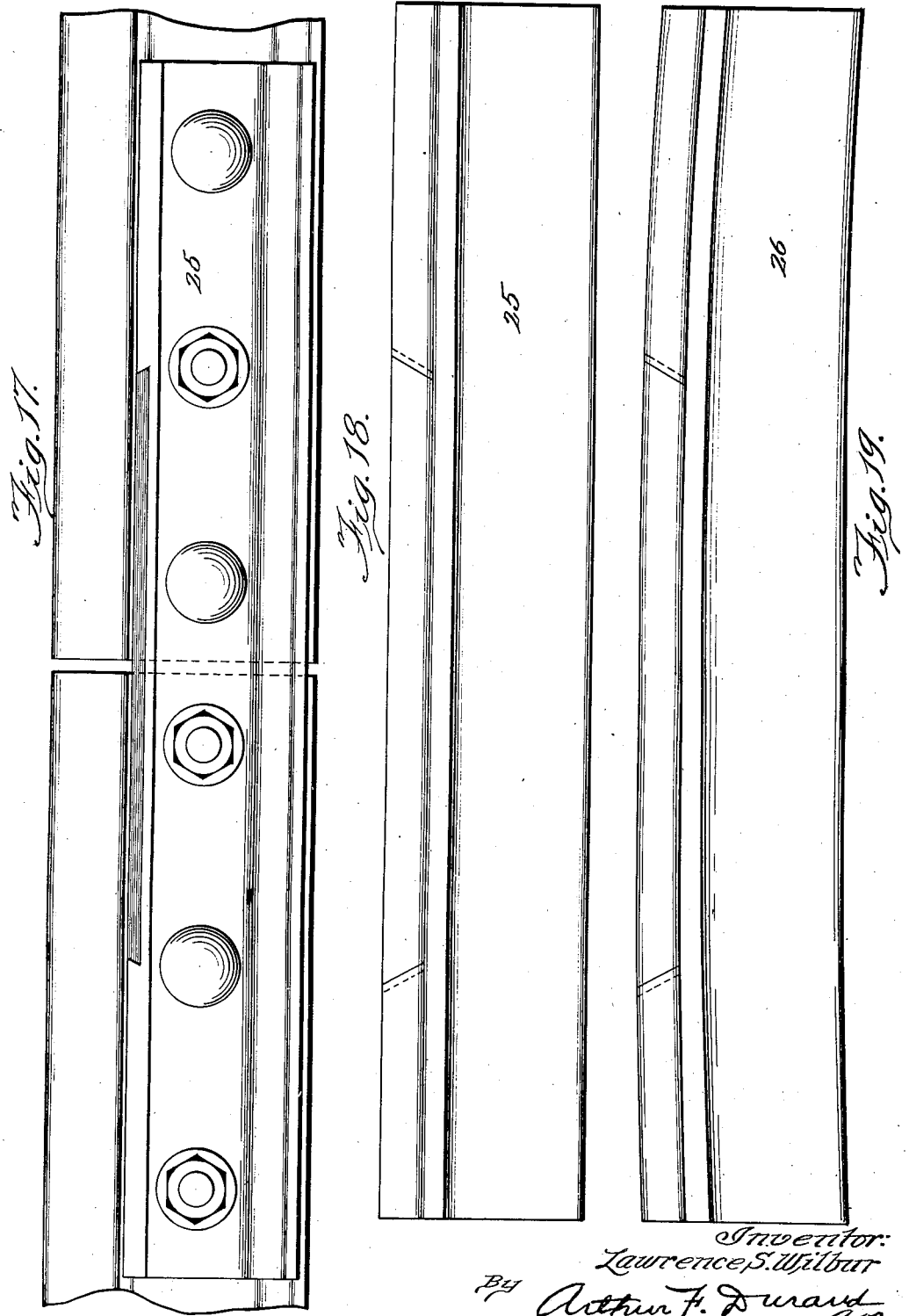

June 9, 1931. L. S. WILBUR 1,809,092
SPLICE BAR OR FISH PLATE
Filed April 15, 1929  8 Sheets-Sheet 8
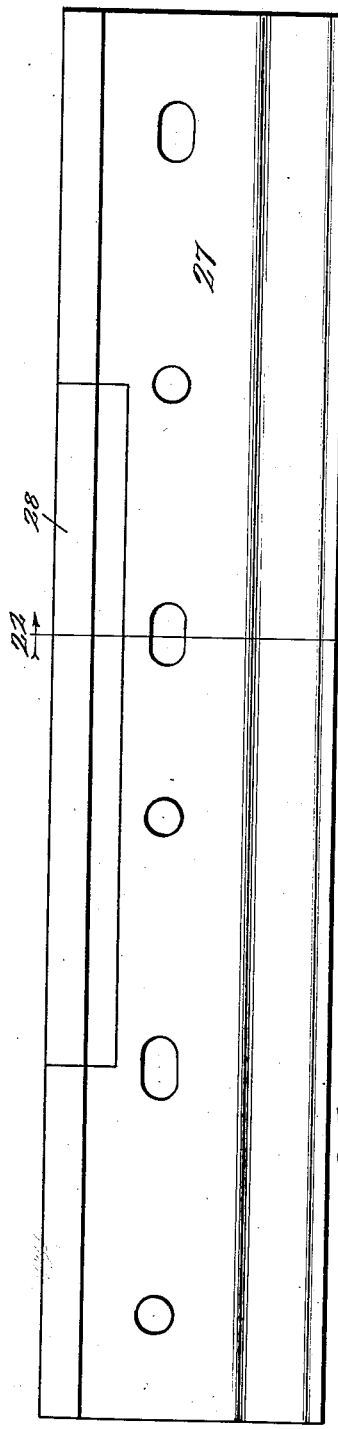
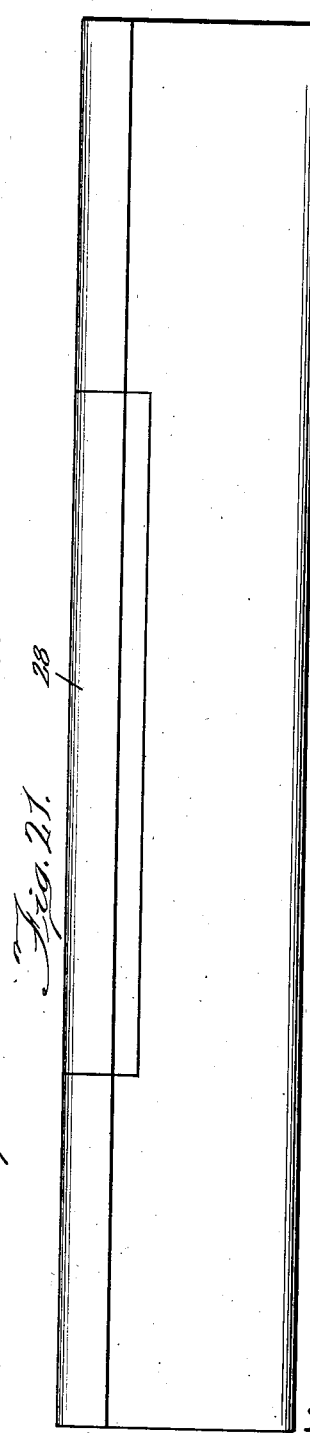
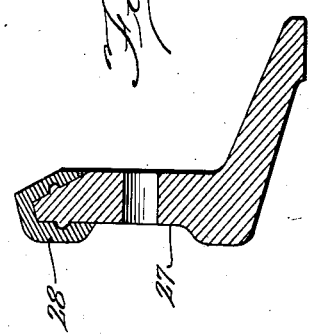

Patented June 9, 1931

1,809,092

UNITED STATES PATENT OFFICE

LAWRENCE S. WILBUR, OF EVANSTON, ILLINOIS, ASSIGNOR TO NATIONAL RAIL JOINT CORPORATION, A CORPORATION OF ILLINOIS

SPLICE BAR OR FISH PLATE

Application filed April 15, 1929. Serial No. 355,097.

This invention relates to splice bars or angle bars or fish plates, such as those employed on rail joints. It is well known that the rails, or the ends thereof, at the joints, become worn and distorted, by the pounding of the car wheels as they pass over the joints. This also tends to wear and distort the splice bars or fish plates of the rail joints, so that these splice bars have to be tightened from time to time, by tightening the rail joint bolts, in order to keep the splice bars in proper engagement with the rails throughout the length of each bar. When the bars become badly worn and distorted, so that the tightening of the bolts no longer can serve to take up the wear, the splice bars are then taken off, and are sometimes reformed or reshaped, thereby to adapt them for further use on rail joints, either on new rails or on old rails.

Generally stated, the object of the invention is to provide a novel and improved form of splice bar or fish plate, either a new bar or an old one reformed and reshaped, having its top reinforced by a separate piece of metal secured thereto, which separate piece of metal may be harder and more durable than the metal of the angle bar itself, or of any suitable or desired character, whereby the top or upper edge of the splice bar is adapted to properly engage the rails and to withstand the hard usage fully as well as, or even better than, the original splice bar, when the bar in question is an old bar reformed or reshaped, or even better than a new bar formed in one integral piece of metal, inasmuch as the added or separate piece of metal can have more wear resistance than the metal from which splice bars are ordinarily made.

Another object is to provide improved means for forming the desired holes in the splice bars, either in new or old bars reformed, by the addition of a metal strip to the side of the bar, said strip having hollow portions that extend through the bar, which provide the holes for the bolts of the rail joints.

It is also an object to provide certain details and features of construction and combinations tending to increase the general efficiency and the desirability of rail joint splice bars or fish plates of this particular character.

To the foregoing and other useful ends, the invention consists in the matters hereinafter set forth and claimed, and shown in the accompanying drawings, in which,—

Fig. 1 is a side elevation of a rail joint provided with splice bars embodying the principles of the invention.

Fig. 2 is a similar view, showing a different form of the invention.

Fig. 3 is a plan view of a portion of the splice bar shown in Fig. 2.

Fig. 4 is a vertical transverse section on line 4—4 in Fig. 1.

Fig. 5 is a transverse vertical section on line 5—5 in Fig. 2.

Fig. 6 is a perspective of the metal insert shown at the top of the splice bar in Fig. 1, except that in Fig. 6 the strip is straight instead of being slightly tapered in thickness at each end as in Fig. 1.

Fig. 7 is a perspective of the metal insert or reinforce shown at the top of the splice bar in Fig. 2.

Fig. 8 is a side elevation of a rail joint having splice bars embodying the principles of the invention, but showing a different form of the invention.

Fig. 9 is a horizontal longitudinal section on line 9—9 in Fig 8.

Fig. 10 is a horizontal longitudinal section on line 10—10 in Fig. 11.

Fig. 11 is a side elevation of a rail joint, showing a different form of the invention.

Fig. 14 is a side elevation of a rail joint showing a different form of the invention.

Fig. 15 is a plan view of the splice bar shown in Fig. 14.

Fig 16 is a similar view, showing a different form of the invention.

Fig. 17 is a side elevation of a rail joint showing a different form of the invention.

Fig. 18 is a plan view of the splice bar shown in Fig. 17.

Fig. 19 is a similar view, showing a different form of the invention.

Fig. 20 is a side elevation of a splice bar, showing a different form of the invention.

Fig. 21 is a plan view of the splice bar shown in Fig. 20.

Fig. 22 is a vertical transverse section on line 22—22 in Fig. 20.

Figure 12:
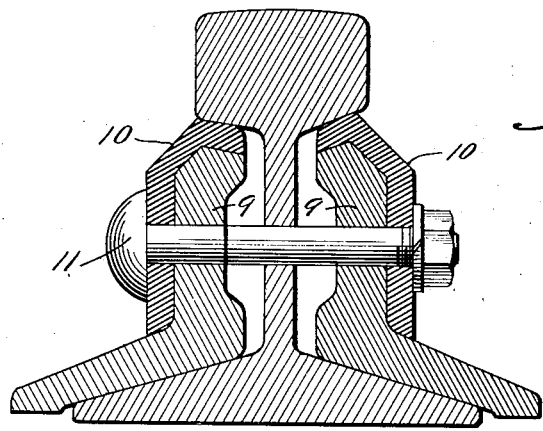
Fig. 12 is a vertical transverse section on line 12—12 in Fig. 9.

As thus illustrated, referring to Figs. 1, 4 and 6, the invention comprises a rail joint having a splice bar 1 provided at its top with an insert or reinforcing strip of metal 2, preferably humped or crowned to make the bar higher at its middle than at its ends. This insert or reinforce 2 can be of hardened steel or any suitable metal, and can be much harder and more wear resistant than the metal of the splice bar itself. The splice bar can be either a new bar or an old one reformed or reshaped. Preferably, a bar of this kind is produced by reforming or reshaping an old or worn and distorted splice bar, as in the reforming or reshaping operation the depression 3 can be formed in the top of the bar to receive the said insert or reinforce 2, the latter being dovetailed in place, as shown, the ends of the reinforce or insert being beveled for this purpose. The rails 4 can be either new or old rails; but with the humped or crowned splice bar, old and worn or distorted rails can be used to advantage, as the humped or crowned top of the splice bar will more readily fit such rails. The pounding of the car wheels causes the rails to become mashed or flattened at their ends, and distorted, with the result that the fishing height is in time greater at the ends of the rails than at the ends of the splice bar, and hence the splice bar shown and described will more readily fit such rails. If used on new rails, for example, the ends of the splice bar can be drawn in more closely to the rails than the middle portion, thus placing the bar under tension, so that its middle portion will tend constantly to spring inwardly, and thereby automatically take up wear.

In Figs. 2, 3, 5 and 7, the splice bar 5 has its top provided with a reinforcing strip 6 having dovetailed portions 7 on its bottom to fit dovetailed and tapered recesses 8 formed in the top of the bar. The strip 6, it will be seen, extends the full length of the bar. This strip 6 can be hardened steel or any suitable metal, and can be much more wear-resistant than the metal from which splice bars are ordinarily made. The bar 5 is straight at the top and bottom, when viewed from the side, and is straight throughout its length, when viewed from above, as shown in Fig. 3 of the drawings. This splice bar 5 can be either a new bar or an old one reformed or reshaped, and the rails can be either new rails or old rails. Preferably, the bar 5 is an old bar reformed or reshaped, inasmuch as the recesses 8 can be easily formed in the bar when the latter is heated and then reformed or reshaped, thereby producing a usable bar from an old and practically worn out bar.

Referring to Figs. 8, 9 and 12, the splice bars 9 are each provided with a reinforcing strip 10, which not only fits the top of the splice bar, but which also extends downwardly on the outer side of the bar to the flange of the splice bar, as shown more clearly in Fig. 12 of the drawings. With this construction, the splice bar can be either a new bar or an old one reformed or reshaped; but it is preferable to take old and worn bars and reform them to receive the reinforcing strip 10 in the manner shown. This strip extends the full length of the splice bar and provides a hard top for the splice bar. The rails can be either new or old rails. The reinforce 10 can be held in place merely by the bolts 11, or these reinforcing strips can be welded or otherwise fastened to the splice bars, as by reforming old splice bars when they are heated, and by applying the reinforcing strips at the same time and by the same pressure that is used to reform or reshape the bars.

Figure 13:
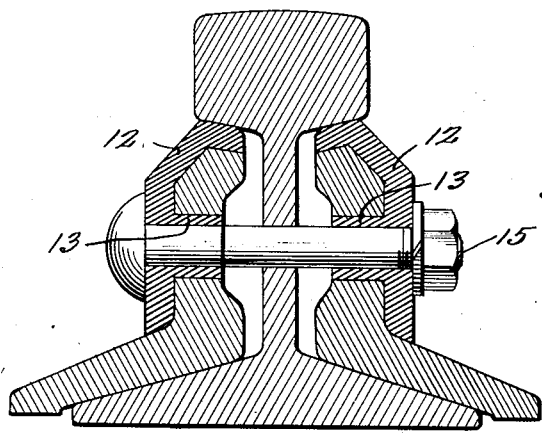
Fig. 13 is a vertical transverse section on line 13—13 in Fig. 10.

Referring to Figs. 10, 11 and 13, it will be seen that the construction is similar to that immediately preceding, but in this case the reinforcing strips 12 have hollow portions 13 on their inner sides, these hollow portions extending through the splice bars 14 to form the holes for the bolts 15 in the manner shown. In this way the same reinforcing strip not only provides a top for the splice bar, but also provides suitable holes for the splice bar. The splice bar can be either a new bar or an old one reformed or reshaped; but a bar of this kind is preferably an old and worn one which has been reformed and reshaped to make it again usable on rail joints. Moreover, in this case the reinforcing strip 12 is so formed that it does not extent the full length of the top of the splice bar, but, to the contrary, is formed with a portion which is of a length to extend along only the middle portion of the bar, leaving the upper end portions 16 of the bar flush with the top of the portion 17 of the reinforcing strip. The rails of this joint can be either new rails or old rails. The reinforcing strip 12 can be applied to the splice bar as a separate and loose piece, to be held in place only by its shape and the bolts of the joint, or it can be welded or otherwise secured to the splice bar, as by forming and applying this reinforcing strip to the heated splice bar while the latter is being reformed or reshaped. The bar can be squeezed while soft into the strip 12, or the latter can be squeezed while soft into the angle bar. Any suitable method can be employed for producing this bar.

In Figs. 14 and 15, the splice bar 18 is similar to the one shown in Figs. 10, 11 and 13, but in this case the top portion 19 of the reinforcing strip 20 is humped or crowned, and the continuing upper end portions 21 of the splice bar are formed accordingly, so that the top of the bar is curved upwardly at its middle, from one extreme end of the bar to the other, thus adapting the bar more especially for use on old rails, or rails that have been badly deformed or distorted by the pounding of the car wheels, such as the rails 22 shown in Fig. 14 of the drawings.

In Fig. 16, the bar 23 and its reinforcing strip 24 are similar to the ones shown in Figs. 14 and 15, but in this case the bar and its reinforce are curved inwardly at the middle, whereby the ends of the splice bar and its reinforce will be forced inwardly toward the rails when the bolts are tightened, thus placing the bar under tension, so that its middle portion will tend constantly to spring inwardly, thus automatically taking up wear.

In Figs. 17 and 18, the splice bar 25 is similar to the one shown in Fig. 1 of the drawings, but in this case the top of the bar is straight, when viewed from the side, and is not humped or crowned, whereby the bar 25, when used on new rails, will remain straight when properly tightened in place.

In Fig. 19, the bar 26 is similar to the one shown in Figs. 17 and 18, but in this case the bar is curved, when viewed from above, so that its end portions will be forced inwardly when the bolts are properly tightened, thus placing the splice bar under tension, serving to automatically take up wear along the middle of the bar.

In Figs. 20, 21 and 22, the splice bar 27 is provided along its upper middle portion with an inverted trough-shaped reinforcing strip 28, which is welded or otherwise fastened to the splice bar in the manner shown. In this way the top of the bar is provided with a hardened steel or other metal reinforce, along its middle portion, thus adapting the bar for hard usage on a rail joint. This splice bar can be either a new bar or an old bar reformed or reshaped; but, preferably, the bar is an old and worn bar which has been reformed or reshaped by exerting pressure thereon after the bar is heated, in any suitable or desired manner. The reinforce 28 can be applied during the process of reforming or reshaping the bar, by suitable die mechanism or other means.

Thus, in each form of the invention, separate metal, which may be a different kind of metal from that of the splice bar, is added to the top of the angle bar or flanged fish plate to increase its wear resistance. These bars can all be new bars, if desired; but as new bars are ordinarily made by cutting up long lengths of straight stock, it is preferable to produce the different forms of the invention shown and described by taking old and worn bars and reforming or reshaping them in the desired manner, for in each case the reinforcing element can be applied during the reshaping or reforming of the bar. Also, as shown and described, the provision of a reinforced top for the bar can be accompanied by a renewal of the holes of the bar. For example, an old bar can be reshaped or reformed, by exerting pressure thereon in any desired manner, and by enlarging the holes, and the reinforcing element can thereafter, or at substantially the same time, be incorporated in place on the bar in the manner shown and described, thus not only providing a new and effective top for the splice bar, but also new and accurate holes for the bar.

It is obvious that the different splice bars or fish plates shown and described can be used in one and the same structure, as a bar of one kind can be used on one side of the rail joint, and a bar of another kind can be used on the other side of the same rail joint, depending upon the worn or distorted condition of the rails. The bars can all be used in combination in the same structure, on a series of connected rail joints.

The bushings 13 can be incorporated in the splice bars by any suitable method, but preferably without having the act or step of fixing or placing the bushings in the bar accompanied by any reduction in thickness of the web of the splice bar immediately around the bushings.

The strips 2 and 6 are both dovetailed into the top of the angle bar or fish plate, and are then each a fixed or rigid part of the plate. The strips 10 and 12 may also be fixed upon and rigid with the bar or plate, as explained. The different bars or fish plates can be used in combination with each other, on the same rail joints, or on successive joints in the same track structure, depending upon the condition of the rails and whether they are worn more or less or are new.

What I claim as my invention is:

1. A rail joint comprising a splice bar or fish plate formed with a flanged foot and having its top reinforced by a separately formed and rigidly attached wearing strip of metal contacting with and bridging the joint between the ends of the rails, the fish plate and its said strip being solidly united, whereby the strip is a fixed part of the fish plate.

2. A rail joint as specified in claim 1, said strip of metal also extending downwardly a distance on the outer side of the splice bar.

3. A rail joint as specified in claim 1, said strip of metal also extending downwardly a distance on the outer side of the splice bar, and having hollow portions extending through the bar, these hollow portions providing bolt holes for the bolts of the rail joint.

4. A rail joint as specified in claim 1, said strip of metal being welded to the bar.

5. A rail joint as specified in claim 1, said strip of metal being set into the bar.

6. A rail joint comprising a splice bar or fish plate provided on its outer side with a separately formed strip of metal, said metal strip having hollow portions extending throgh the bar, these hollow portions providing bolt holes for the bolts, of the rail joint.

7. A rail joint as specified in claim 6, said splice bar being a reformed old and worn bar reshaped to accommodate said metal strip and hollow portions.

8. A rail joint as specified in claim 1, said splice bar being a reformed old and worn bar made over and reformed to accommodate said metal strip.

9. An angle bar fish plate produced by the incorporation of metal bushings in the bar, to provide holes for the rail joint bolts, such incorporation being without any accompanying reduction of thickness of the web of the bar immediately around said bushings.

10. A structure as specified in claim 1, said strip being dovetailed into the top of said fish plate.

11. A structure as specified in claim 1, said strip being a rigid and fixed part of said fish plate.

12. A structure as specified in claim 1, said strip having portions forming bushings for the bolt holes of said fish plate.

13. A structure as specified in claim 1, said foot contacting metallicly with the top of the rail flange.

14. A rail joint comprising a splice bar or fish plate formed with a flanged foot and having its tap reinforced by a separately formed wearing strip of metal contacting with and bridging the joint between the ends of the rails and formed with an inner edge terminating at the top of said fish plate, said strip being made of metal that is harder than the metal of the fish plate itself.

15. An angle bar fish plate having a reinforcing strip of metal that is harder than the metal of the fish plate itself, rigidly attached to the fish plate and bridging the joint between the rails, whereby the strip is a fixed part of the fish plate.

Specification signed this 5th day of April, 1929.

LAWRENCE S. WILBUR.